Dec. 14, 1954  S. EPSTEIN ET AL  2,697,158
ELECTRIC STRAIN GAUGE
Filed May 19, 1952  4 Sheets-Sheet 1
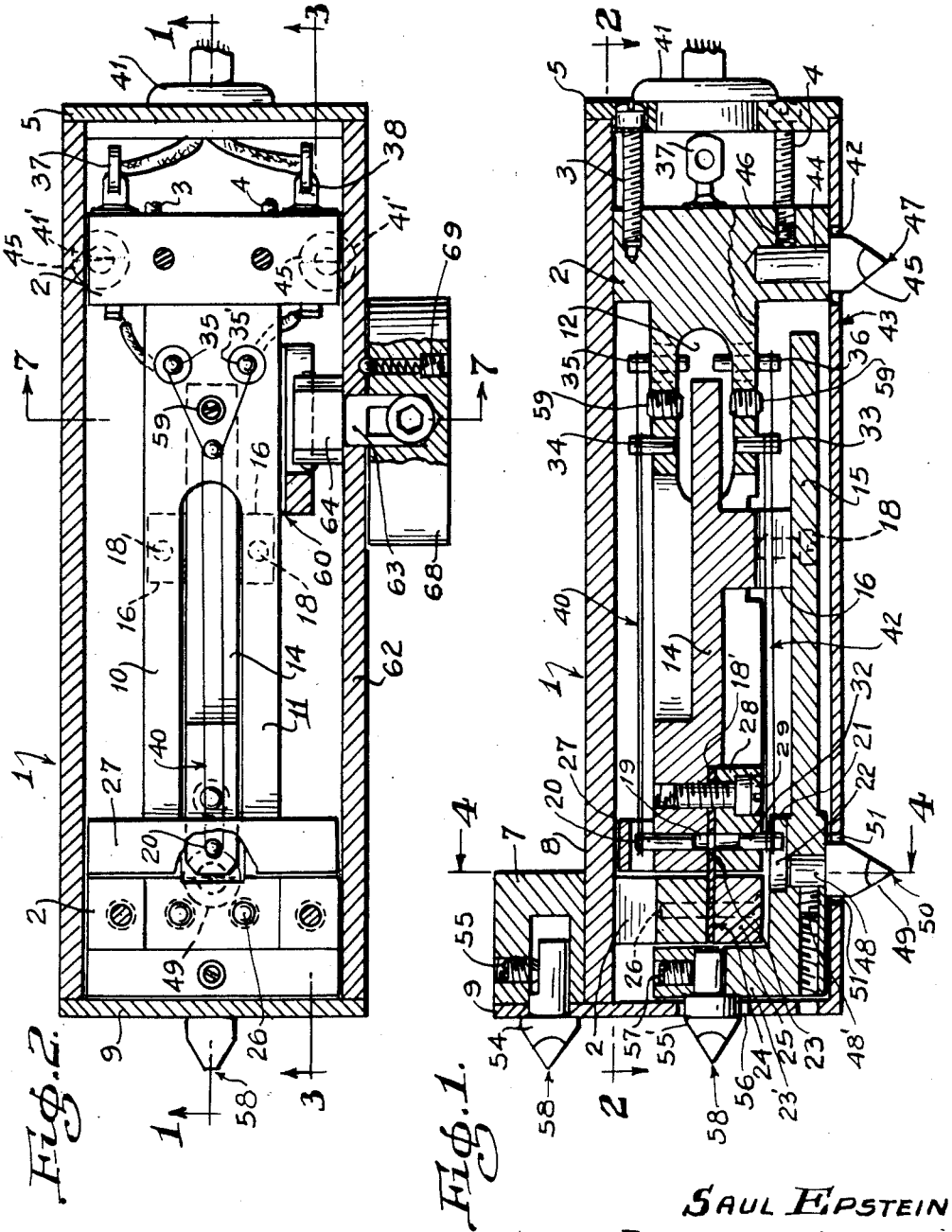
SAUL EPSTEIN
& LOUIS D. STATHAM
INVENTORS.
BY Philip Subkow
ATTORNEY.

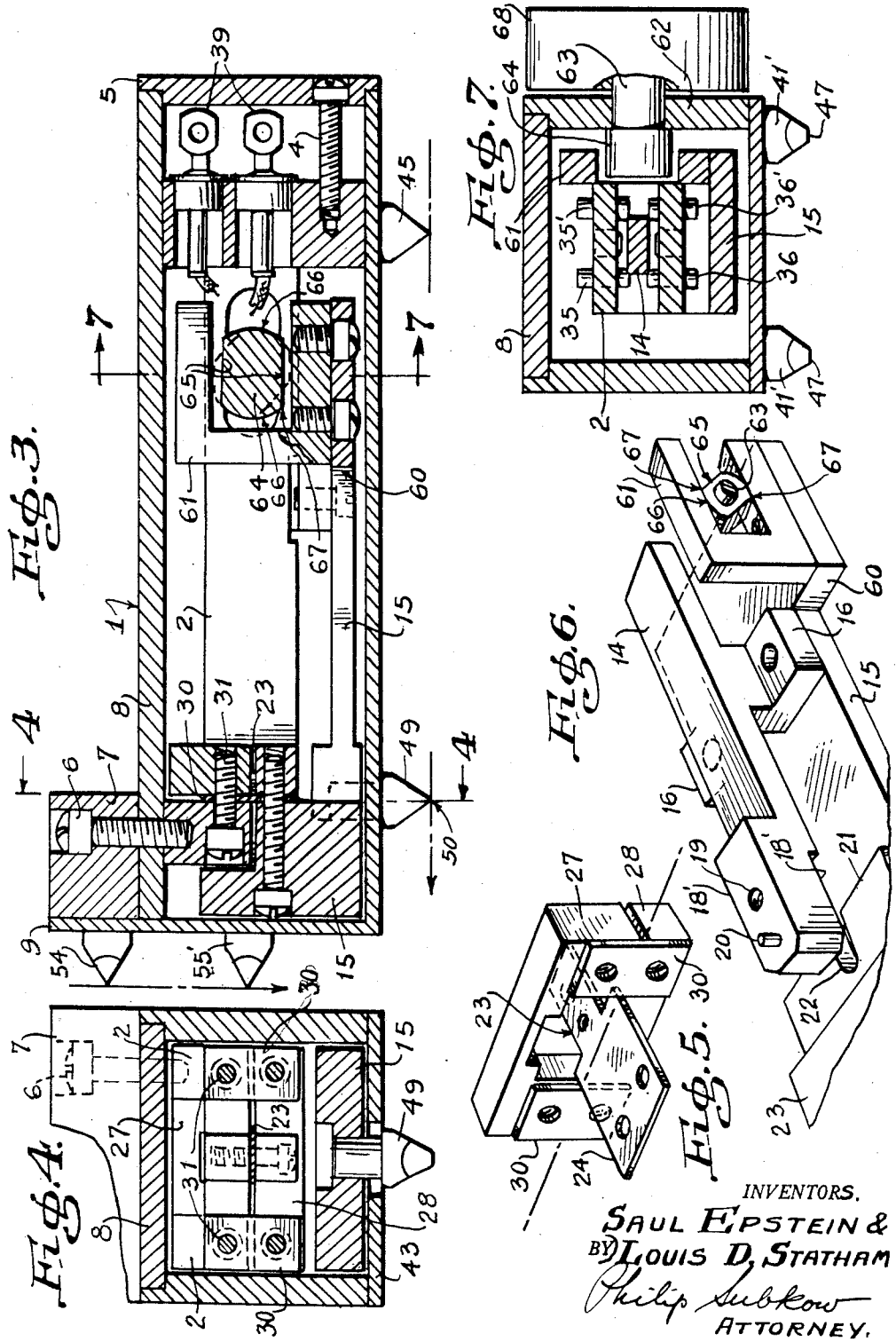

Dec. 14, 1954  S. EPSTEIN ET AL  2,697,158
ELECTRIC STRAIN GAUGE
Filed May 19, 1952  4 Sheets-Sheet 3
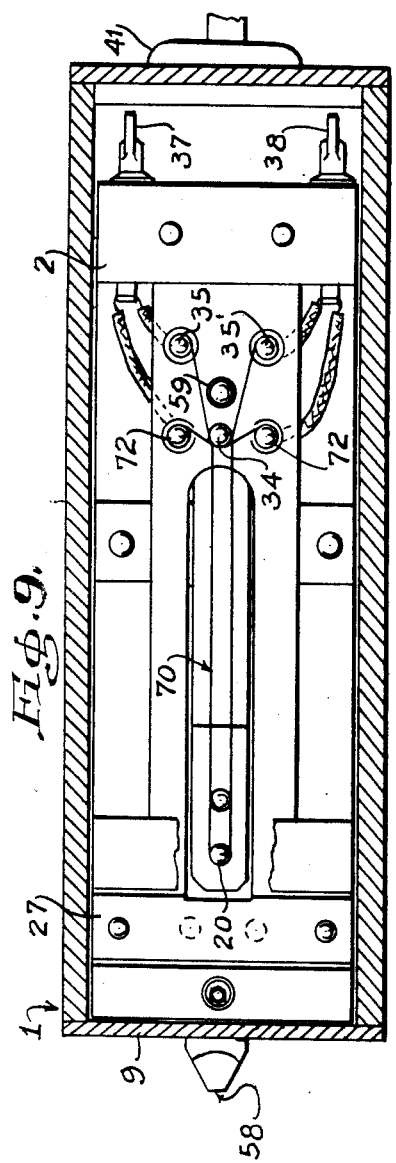
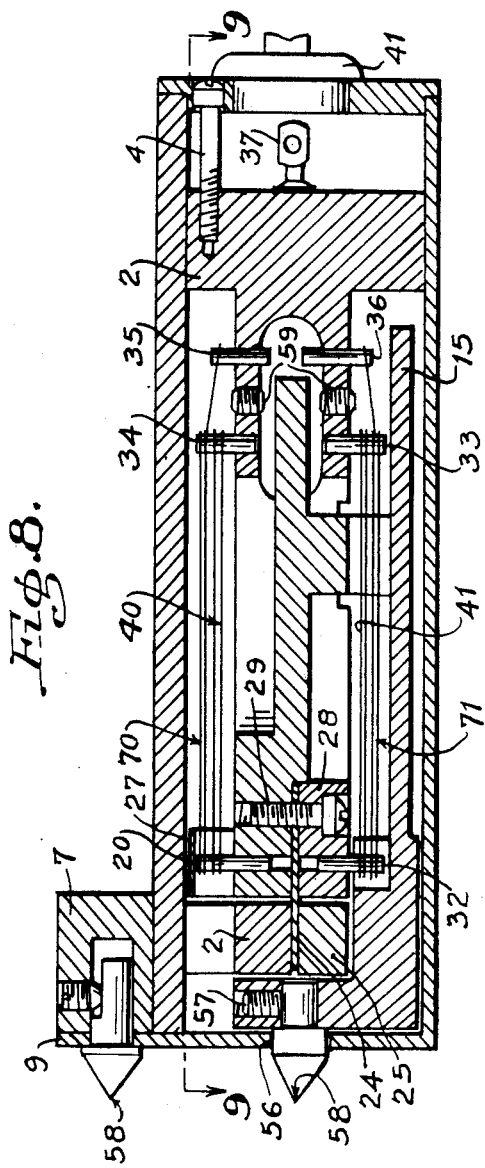
SAUL EPSTEIN
& LOUIS D. STATHAM
INVENTORS.
BY Philip Subkow
ATTORNEY.

Dec. 14, 1954  S. EPSTEIN ET AL  2,697,158
ELECTRIC STRAIN GAUGE
Filed May 19, 1952  4 Sheets-Sheet 4
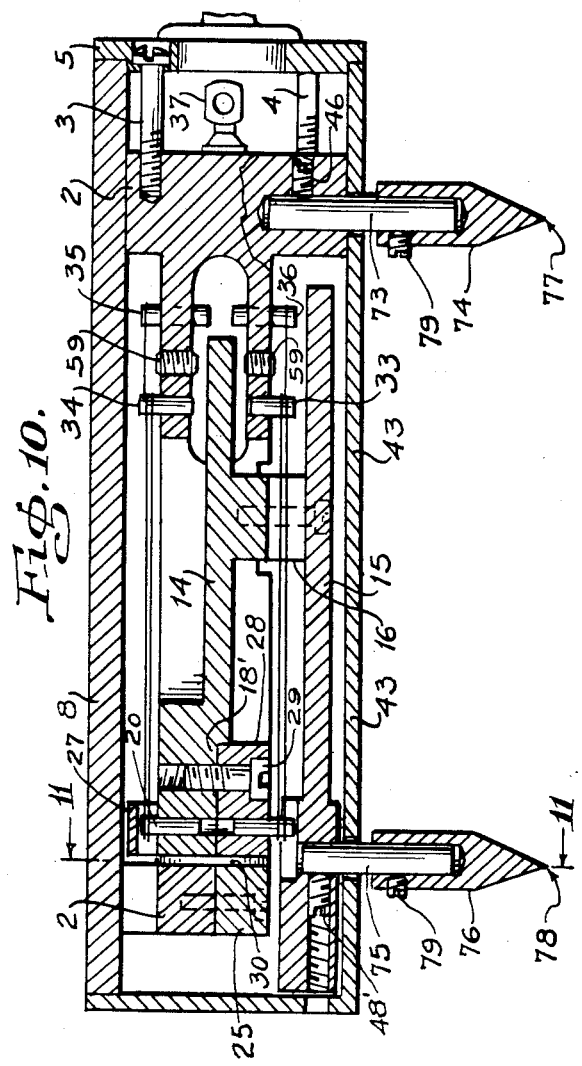
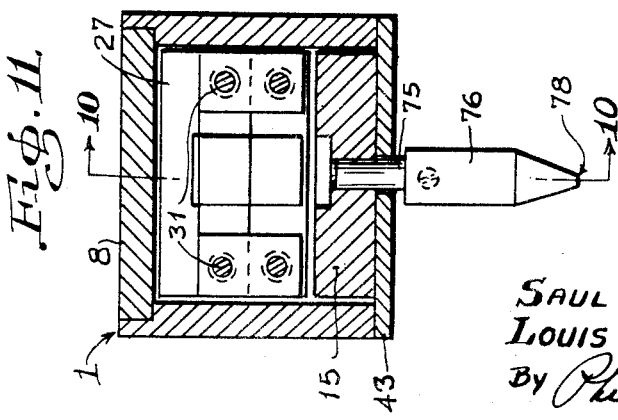
INVENTORS.
SAUL EPSTEIN &
LOUIS D. STATHAM
BY Philip Subkow
ATTORNEY.

United States Patent Office 2,697,158
Patented Dec. 14, 1954

2,697,158

ELECTRIC STRAIN GAUGE

Saul Epstein, Sherman Oaks, and Louis D. Statham, Beverly Hills, Calif., assignors to Statham Laboratories, Inc., Los Angeles, Calif., a corporation of California Application May 19, 1952, Serial No. 288,672

24 Claims. (Cl. 201—63)

This invention relates to a strain gage of the unbonded electrical resistance wire type, now known quite generally to engineers as the Statham gage. Such gages have been described in United States Letters Patents as Nos. 2,453,549 and 2,573,286.

A true strain gage, as understood in the science of stress analysis, is defined as a device employed to measure linear deformation, over a given gage length, occurring in the material of a structure during the loading of the structure. Such an instrument must be able to report the percentage change in a determined linear distance between two points in the structure caused by the application of the load to the structure. This is essential due to the mathematical definition of the strain in a loaded structure as the change per unit length caused by the loading.

It is an object of our invention to provide a strain gage which need not, but may, be clamped or otherwise rigidly affixed to the structure undergoing load.

It is a further object of our invention to provide a strain gage such that the application of a force holding the strain gage to the structure, whose strain is to be measured, does not affect or influence the gage operation and need not be compensated for.

It is a further object of our invention to design a strain gage which may be applied to a structure undergoing load and which may be incorporated into a telemetering system.

It is a further object of our invention to devise a strain gage in which the moving parts are light and which has a high natural frequency so that it will not be disturbed by the relatively low frequency vibrations frequently encountered where measurements of strain in members are made.

It is a further object of our invention to devise a gage having such frequency characteristics that it may be used in measuring dynamic strain either of the oscillatory or transient strain type.

It is an object of our invention to design a strain gage of the above characteristics employing unbonded electrical strain sensitive resistance wires.

It is a further object of our invention to provide a strain gage which will be sensitive to small as well as to large strains and one in which the effect of the strain in the structure on the gage may be magnified and the degree of magnification of the effects of the strain on the gage may be adjusted. The degree of this magnification is hereinafter referred to as the gage factor.

It is a further object of our invention to design a strain gage using unbonded strain wires such that the gage may be applied to spaced points in a structure whose strain under load is to be measured and the separation of the points under load transferred to the wires so as to cause an alteration in the length of the wires and a consequent change in resistance.

It is a further object of our invention to connect the wires to said spaced points by a leverage system whose characteristics may be altered to magnify the separation of the points on the structure so that consequent variation in the length of the wires bears a ratio to the degree of separation of the points which ratio may be adjusted at will, and we thus produce a gage with a readily variable gage factor.

In the strain gage of our invention the forces necessary to cause a variation in the length of the strain sensitive wires are small. The gage requires very little force to operate, and therefore the gage may be lightly applied to the structure and even held against the structure by rubber bands or by hand and need not be clamped or otherwise firmly fixed to the structure.

The preferred embodiment of our invention includes a gage having a fixed frame on which an armature is movably mounted, preferably upon a hinge with strain sensitive wire or wires stretched between pins mounted on the movable armature and upon the fixed frame. Supports are mounted in the fixed frame and in the armature so that the gage may be applied to the structure whose strain is to be measured in such manner that when the structure is subjected to strain, the points of support approach or separate to cause the movable member to be moved with respect to the fixed frame member and the strain sensitive wire consequently altered in length.

By mounting the armature on a hinge and positioning the support and one of the wire mountings in such spaced relation upon the armature that the wire mounting is longitudinally spaced from the support, a mechanical advantage is introduced into the gage so that the pin moves (and the wire length is consequently altered) to a degree which is greater or less, if desired, than the displacement of the support upon application of the load. Thus the movement of the movable support mounted on the movable member may be transformed into an alteration of wire length and consequently the resistance of the wire by a factor (known herein as the gage factor) which may be made to a desired amount.

These and other objects of our invention will be understood by those skilled in the art from the foregoing taken together with the following description and the drawings, in which Fig. 1 is an irregular vertical section taken on line 1—1 of Fig. 2;
Fig. 2 is a section taken on line 2—2 of Fig. 1;
Fig. 3 is a section taken on line 3—3 of Fig. 2;
Fig. 4 is a section taken on line 4—4 of Fig. 3;
Fig. 5 is a perspective view of a detail of the instrument;
Fig. 6 is a perspective view of the movable member and the locking mechanism; and
Fig. 7 is a section taken on line 7—7 of Fig. 3;
Fig. 8 is a vertical section similar to Fig. 1, showing a modification of the strain gage;
Fig. 9 is a section taken on line 9—9 of Fig. 8;
Fig. 10 is a section similar to Fig. 1 showing another modification of the strain gage; and
Fig. 11 is a section taken on line 11—11 of Fig. 10.

The instrument is encased in case 1 and contains the frame member 2 which is rigidly held in the case by screws 3 and 4 passing through the end wall 5 of the case and by the screw 6 (see Fig. 3) passing through the block 7 positioned at the opposite end of the case on the top 8 and abutting the other end wall 9 of the instrument case.

The frame 2 is a U-shaped member having legs 10 and 11 (Fig. 2) and transversely slotted at 12 (see Fig. 1) at the base of the U-shaped member.

The armature member is made in two parts with an upper member 14 and a lower member 15 (see Figs. 1 and 6) acting as a lever. The upper member is mounted in spaced relationship from the lower member by the legs 16 which are held securely on the upper face of the lower member by screws 18 passing into the tapped holes in the legs 16.

The upper member is stepped at one end, here called the front end, to distinguish from the opposite free end of the upper member, to form a step 18' in which is positioned a threaded bore 19 and an insulating pin such as a sapphire pin 20 (see Figs. 1, 2, and 6).

The lower member (see Figs. 1 and 6) is stepped at its front end 21 adjacent the front end of the upper member and is slotted at 22 for purposes to be described below. An L shaped extension 23' is formed at the end of the member 15 for purposes to be described below.

A flat spring 24 (see Figs. 1, 4, and 5) is clamped horizontally between the clamping block 25 and the under face of frame 2 at the adjacent end of the frame by means of screws 26 passing through the clamping block 25 and the spring 24 into the frame. The narrower section 23 of spring 24 (see Figs. 4 and 5) is clamped to the underneath side of the step 18' of the member 14 by means of a clamping block 27 (Figs. 1, 4, and 5) fixedly mounted on the adjacent ends of the legs 10 and 11 of the U-shaped frame member and clamping block 28 which clamps the spring extension 23 to the underneath side of the step 18' by means of a screw 29 which passes through the spring and into the threaded bore 19 in the underneath side of the step 18'.

Two vertically disposed springs 30 (see Figs. 3, 4, and 5), one on each side of the spring 24, are clamped between the clamping blocks 27 and 28 and the clamping block 25 and the inner face of the forward end of the frame member 2 by means of screws 31 passing through holes provided in springs 30. The spring 24 and the springs 30, perpendicularly disposed to 24, each act as hinges between the movable member 14 and the frame 2. The mutually coincidental lines of bending, positioned between 14 and 2, each separately act as the axis of a hinge between 14 and 2.

A pin 32 similar to pin 20 is positioned in the under face of the clamping block 28 and disposed axially of the pin 20. The slot 22 is provided to make room for the motion of the pin 32, as will be described below. Similar pins 33 and 34 are coaxially mounted in and at the rear end of the frame 2 at the base and between the legs 10 and 11. The pin 34 is mounted in the top face and the pin 33 in the bottom face of the frame member 2. The line connecting the centers of the pins 20 and 34 and the line connecting the pin 32 and the pin 33 are each perpendicular to the faces of the flat springs 30 and parallel to the faces of the flat springs 24 and 23 which are perpendicular to the faces of the springs 30.

Two terminal pins 35 and 35' are mounted on the upper faces of the frame and two similarly disposed terminal pins 36 and 36' are mounted on the lower face of the frame.

Strain sensitive wires 40, such as are used in the conventional unbonded strain gages heretofore referred to, are wound in a loop on pins 20 and 34 and the ends are each electrically connected to the terminals 35 and 35' which are mounted in insulated bushings in the frame.

Similar strain wires 42 are mounted in a loop on the pins 32 and 33 and the ends of the loop are electrically connected to the terminal pins 36 and 36' (see Figs. 1 and 7) mounted in the lower face of the frame similarly to pins 35 and 35'.

Pins 35 and 36 are electrically connected to a terminal 37 and the pin 35' is electrically connected to terminal 38 and the pin 36' to terminal 39. These terminals 37, 38, and 39 may be electrically connected to a suitable connecting plug 41.

Mounted near the rear end of the frame are two legs 45, one on each side of the frame, passing freely through bores 42 in the bottom 43 of the case 1. The shanks of legs 45 are positioned in the bores 44 provided in the bottom of the adjacent end of the frame. The shanks may each be gripped in the bores by a set screw 46.

The legs are each formed with a knife edge 47 and the legs are aligned so the knife edges are on a straight line which is perpendicular to the line between the pin centers.

At the forward end of the lower frame member is positioned a bore into which is inserted the shank 48 of the leg 49 constructed similarly to the legs 45 and held in position by a set screw 48'. The leg projects through a bore 51 in the bottom 43. The knife edge 50 is aligned parallel to the knife edges 47. The center line of the leg 49 is perpendicular to the face of the spring 24 and passes through the central plane of the springs 30, i. e., is midway between the opposite flat faces of the springs 30. The center line of the leg 49 intersects on the center line of the instrument which is midway between the center lines of the legs 45. Thus the center lines of pins 20, 32, 33, and 34 and the center line of the leg 49 are coplanar and the knife edges of the legs 45 and 49 are parallel to each other and perpendicular to said plane.

As shown (see Fig. 1), auxiliary legs 54 and 55' are provided, projecting from the face of the front end 9 of the case. Thus a leg 54 is mounted in the block 7 by means of a set screw 55. A second leg 55' passes through a bore 56 in the end 9 and is secured in a suitable bore in the forward end of the L-shaped extension 23' of the lower member 15 by means of a set screw 57. The legs are provided with parallel knife edges 58. The center line of the leg 55' is perpendicular to the springs 30 and intersects the line of bending of the springs 30 between the block 27 and the frame and the clamping blocks 25 and 28 and is within the central plane of the spring 24.

Positioned in the upper and lower faces of the frame member 2 and adjacent the free end of the upper member 16, one on each side thereof, are two stop screws 59 entering the slat 12.

The lower member 15 (see Figs. 2, 3, 6, 7) has a side extension 60 projecting toward the side wall 62 of the case. Rigidly mounted on the extension 60 is a U-shaped member 61 which is set on its side on the extension 60. A shaft 63 is rotatably mounted in the wall 62 and carries at one end a cam 64 having four faces which ride between the inner faces of the legs of the U-shaped member 61. Two opposing faces 65, being closer together than the remaining faces 66 of the cam, meet on corners 67. The shaft may be rotated by the knob 68 and secured in place in its several positions, as described below, by the ball and detent lock 69.

The operation of the unit is as follows:

With the knob rotated so the cam corners 67 are positioned against the inner faces of the legs of the U-shaped member 61, i. e., with the cam flat faces 65 at 45° to the faces of the legs of the U, and with the detent lock 69 locking the knob 68 in position, the movable member 14 is disposed centrally between the stop screws 59, that is, the springs 24 and 30 are unstressed by any bending. No stress load is thus induced in the wires and the zero reading of the instrument is assured.

The instrument may then be set by hand or otherwise secured to any member which is to be stressed. Assume that this is done by setting the knife edges 50 and 47 on the member to be stressed. Because the center line of the leg 49 is coincident with the line of bending of the spring 24 and is in the central plane of the springs 30, any loading due to holding or clamping the instrument against the test member will not cause a flexure of the springs 24 or 30. No displacement of the movable member and no stress in the movable member or in the springs is introduced by the operation of mounting the instrument on the test member. The zero setting of the instrument is thus unchanged during mounting.

The knob 68 is then rotated 90 degrees so that the cam faces 65 are parallel to the legs 61 as shown in Fig. 3. The movable member is thus free to move between stops 59.

When the test member is stressed, depending upon whether the surface which the legs rest on is in tension or compression, the legs 49 will either depart from or approach the leg 45. When this occurs the upper member 14, which is connected to the lower member 15, is rotated about the line of bending of the spring 24 which acts as a hinge with the axis of the hinge midway between the faces of the clamping members 27 and 28, and the complementary faces of the frame 2 and the clamping member 25.

It will be observed that the vertical springs 30 will also be flexed along a line of bending which is coincident with the line of bending of the spring 24. These springs, being perpendicular to the spring 24, act to impart a rigidity to the structure in all directions other than in the direction of bending of the spring 24. The arcuate lines of motion of the pins 33 and 34 are thus always in the aforementioned plane and the instrument thus responds exactly to the separation of the legs. No vector of twist perpendicular to the face of the spring 24 is thus allowed sufficient to produce a component of twist perpendicular to the surface of the spring to materially affect the reading instrument when used as described above.

When the legs are made to separate, as when the surface is in tension, the movable member is pulled down, and the upper pin 20 is carried toward the pin 34, reducing the resistance of the wires 40 while the pin 32 is carried away from the pin 33, increasing the resistance of the wires 42. When the legs approach each other, as when the surface is in compression, the rotation of the pins and the variation in resistance are in the opposite direction, as will be readily understood from the above description.

It will be observed that the axis of the pins 20 and 32 is displaced to one side of the axis of the leg 49 and that the knife edge 50 is spaced downwardly from the hinge axis. A bell crank results and the pins 20 and 32 move through an angle whose tangent is a multiple of the degree of movement of the leg 49 to or from the leg 45. Thus, for example (and only to illustrate this multiplication, and not for purposes of limitation), the pin axis may be ⅛" from the line of bending and the knife edge ⅞" from line of bending, and the wires will be altered in length between the pins by a factor equal to one-seventh times the movement of the legs to or from each other. The multiplication factor results in a like multiplication in the change in resistance of the wire due to the movement of the knife edge.

The device illustrated in Fig. 1 employs two wires, one whose tension is reduced and one whose tension is increased on deflection of the movable member. A gage with four action wires may be obtained, as is illustrated in Figs. 8 and 9, by winding two loops 70 and 71 on the pair of pins 20 and 34 and on pins 32 and 33, and spacing the loops 70 and 71, respectively, from loops 40 and 41, respectively, respectively connecting the ends of the loops 70 and 71 to the terminal pins 72 and 72' mounted similarly to terminals 35, 35' and 36 and 36', and connecting the loops in Wheatstone bridge arrangement to four terminals instead of three as shown in Figs. 1 to 7.

The device as described above in Figs. 1 to 7 will report the change over a length equal to the distance between the legs 49 and 45, or between 54 and 55', i. e., when loaded. Since the absolute values of the linear distance between the knife edge 50 and the knife edge 47, i. e., the gage lengths, are known, and since by calibration the relationship between the absolute value of the change in separation of the legs to the output of the gage, i. e., net change in resistance, is known, the absolute value of the strain can be reported as displacement per unit length, directly in terms of the output of the gage.

The instrument reports, however, the average value of the strain existing over the distance between the knife edges 47 and 50. It is frequently desired to determine if such strain is uniform over this length. This may be accomplished by measuring the strain over a shorter gage length and to compare the strain thus determined with the strain reported over the longer gage length.

Means are provided on the instrument for measuring the strain over a gage length which is smaller than the gage length between legs 45 and 49. The shorter gage can thus be made to explore the region over which the strain is determined when using the gage of greater length. Again it is sometimes desirable to measure strain in regions where the longer gage cannot fit.

We have provided in the gage of our invention means which may be used, if desired, to reduce the gage length of the instrument. The leg 54 is similar to legs 45 and 49, and is mounted in block 7 by means of a set screw. The leg 55' is mounted in the L-shaped extension 23' by means of a set screw 57. The knife edges 58 are parallel. The bore 56 is made sufficiently large, in the same manner as the bore 51, to permit of lateral movement of the legs. The center line of the leg 55' is perpendicular to the face of the springs 30 and the line of bending of this spring and coplanar with the central plane of the flat spring 24. Thus the mounting of the instrument with legs 55' and 54 on the test material imposes no load, as was described in connection with the mounting of the instrument on the legs 45 and 49.

It will be seen that as the leg 55' moves freely inside the bore 56 and approaches or departs from the leg 54, as the test material is stressed the L-shaped extension 23' of the member 15 will cause the springs 30 to flex and the movable members 14 and 15 to rotate about the coincident lines of bending of springs 30 and 24. This changes the resistance of the strain wires in a manner similar to the operation of the gage of greater gage length between 50 and 47.

The weight of the movable member is small and therefore the frequency of the gage may be made high. By weighting the arm 15, however, the frequency of the gage may be made low and adjusted to a desirable value.

Figs. 8 and 9 also illustrate a modification in which the legs 49 and 45 and the bores 42 and 51 are omitted and only the horizontal springs 24 are used. In other respects the structure of the gage of Figs. 8 and 9 is similar to that of Figs. 1 to 7 and need not be further described.

We may (as shown in Figs. 10 and 11), by omitting the L-shaped extension 25' and the legs 55' and 54 and also the springs 24, omit the short gage elements without affecting the operation of the instrument.

However, in the forms shown in Figs. 8 to 11, in the reliance on spring parallel to the leg axis requires that care be taken to avoid introducing a twist into the spring suspension when the gage is used. Preferably when using one set of springs we employ the springs parallel to the axis of the leg, since then the load transference axis of the leg is in the central plane of the suspension springs 30 and no deflection occurs by the loading obtained when the gage is first set or clamped to the test member.

Thus, in Figs. 10 and 11 the L-shaped extension is omitted, as are the legs 54 and 55' and the bore hole 56. Since no spring 24 is employed, the clamping block 25 is made to abut the underface of the frame 2. In all other respects the form illustrated in Figs. 10 and 11 is the same as that of Figs. 1 to 7.

Figs. 10 and 11 also illustrate a convenient way for adjusting the legs so as to bring them at a desired distance from the line of bending of the springs 30.

The pin 75 and the two pins 73 replace the legs 45 and 49 and are similarly positioned. Upon the pin 75 are mounted legs 76 by means of set screw 79. The leg carries the knife edge 78. In similar manner the pin 73 carries the leg 74 with knife edge 77. It will be evident that the distance between the knife edge 78 and the line of bending of the spring 30 is adjustable by setting the leg and pin in various vertical positions by means of set screws 79 and 48'. In similar manner the vertical displacement of the knife edges of the two back legs 74 from each other and from 78 may be accomplished.

Thus the instrument may be set on a non-planar surface of uneven elevation or even on a curved surface. In all the forms it will be recognized that the knife edges may be made pointed.

In the form illustrated in Figs. 10 and 11, the variation of the distance between the knife edge 78 and the line of bending of 30 makes possible a means for varying the mechanical advantage of the instrument and therefore the gage factor of the instrument, since the multiplication factor relating the lateral movement of the knife edge 78 to the angular displacement of the pin 20 is a function of the distance between 78 and the line of bending of the spring 30.

While we have described a particular embodiment of our invention for the purpose of illustration, it should be understood that various modifications and adaptations thereof may be made within the spirit of the invention as set forth in the appended claims.

We claim:

1. An electrical resistance wire strain gage, comprising a frame, a movable member, a spring hinge, means for holding said spring securely to said frame, means for holding said spring securely to said movable member at one end of said movable member, said means being spaced from each other, one on each side of a line of bending of said spring, a gage supporting leg connected to and depending from said movable member and disposed substantially coincidentally with the line of bending, a second gage supporting leg connected to said frame and spaced from said first leg, wire supports on said frame, wire supports on said movable member, and an electrical resistance strain wire connected to said supports.

2. An electrical resistance wire strain gage, comprising a frame, a movable member, a flat spring, means for holding said spring securely to said frame, means for holding said spring securely to said movable member at one end of said movable member, said means being spaced from each other, one on each side of a line of bending of said spring, a second flat spring, positioned perpendicularly to the first mentioned flat spring, means for holding said second flat spring securely to said frame, means for holding said second flat spring securely to said movable member at said end of said movable member, said last two named means being spaced from each other on either side of a line of bending of said second mentioned spring, the lines of bending of both of said springs being substantially coincident, a gage supporting leg connected to and depending from said movable member and disposed substantially coincidentally with the line of bending, a second gage supporting leg connected to said frame and spaced from said first leg, wire supports on said frame, wire supports on said movable member, and an electrical resistance strain wire connected to said supports.

3. An electrical resistance wire strain gage, comprising a frame, a movable member, a spring hinge connecting said frame to one end of said movable member, the other end of said member being free, said one end of said movable member being spaced from the frame to form a line of bending of said spring between the movable member and the frame, a wire supporting pin mounted on said movable member adjacent the said spring, a gage supporting leg connected to said frame, a gage supporting leg connected to the movable member and positioned in load-transferring relation coincident with the said line of bending, wire supporting pins mounted on said movable member and said frame, and a strain sensitive electrical resistance wire supported on said pins.

4. An electrical resistance wire strain gage, comprising a frame, a movable member, a flat spring connecting said frame to one end of said movable member, the other end of said member being free, said one end of said movable member being spaced from the frame to form a line of bending of said spring between the movable member and the frame, a second flat spring, positioned perpendicularly to the first mentioned flat spring, means for holding said second flat spring securely to said frame, means for holding said second flat spring securely to said movable member at said first mentioned one end, said last two named means being spaced from each other on either side of a line of bending of said second mentioned spring, the lines of bending of both said springs being substantially coincident, a wire supporting pin mounted on said movable member adjacent the said spring, a gage supporting leg connected to said frame, a gage supporting leg connected to the movable member and positioned in load-transferring relation coincident with the said line of bending, wire supporting pin mounted on said frame, and a strain sensitive electrical resistance wire supported on said pin.

5. An electrical resistance wire strain gage, comprising a frame, a movable member, a gage supporting leg connected to said frame, a second gage supporting leg connected to said movable member, a flat spring hinge positioned parallel to the axis of said second leg, means for holding one end of said spring securely to said frame, means for holding the other end of said spring securely to said movable member, said means being spaced from each other, one on each side of a line of bending of said spring, wire supporting pins on said frame and said movable member, and a strain sensitive resistance wire mounted on a pin on said frame and on a pin on said movable member.

6. An electrical resistance wire strain gage, comprising a frame, a movable member, a spring hinge, means for holding said spring securely to said frame, means for holding said spring securely to said movable member at one end of said movable member, said means being spaced from each other one on each side of a line of bending of said spring, a gage supporting leg connected to said movable member and disposed substantially coincidentally with the line of bending, a second gage supporting leg connected to said frame and spaced from said first leg, a wire supporting pin on said frame, a wire supporting pin on said movable member, an electrical resistance strain wire connected to said supporting pins, the extension of said wire between said pins being perpendicular to said line of bending and the axis of said leg connected to the movable member, and the axis of said pin on said movable member being displaced linearly from said line of bending.

7. An electrical resistance wire strain gage, comprising a frame, a movable member, a flat spring, means for holding said spring securely to said movable member at one end of said movable member, means for holding said spring securely to said frame, said means being spaced from each other, one on each side of a line of bending of said spring, a second flat spring, positioned perpendicularly to the first mentioned flat spring, means for holding said second flat spring securely to said frame, means for holding said second flat spring securely to said movable member at said first mentioned end, said last two named means being spaced from each other, one on each side of a line of bending of said second mentioned spring, the lines of bending of both of said springs being substantially coincident, a gage supporting leg connected to said movable member and disposed substantially coincidentally with the line of bending, a second gage supporting leg connected to said frame and spaced from said first leg, a wire supporting pin on said frame, a wire supporting pin on said movable member, an electrical resistance strain wire connected to said supporting pins, the extension of said wire between said pins being perpendicular to said lines of bending and to the axis of said leg connected to the movable member, the axis of said pin on said movable member being displaced linearly from said line of bending.

8. An electrical resistance wire strain gage, comprising a frame, a movable member, a spring hinge connecting said frame to one end of said movable member, the other end of said member being free, said one end of said movable member being spaced from the frame to form a line of bending of said spring between the movable member and the frame, a wire supporting pin mounted on said movable member adjacent the said spring, a gage supporting leg connected to said frame, a gage supporting leg connected to the movable member and positioned in load-transferring relation coincident with the said line of bending, wire supporting pins mounted on said movable member and said frame, a strain sensitive electrical resistance wire supported on said pins, the extension of the wire between said pins being perpendicular to said line of bending and to the axis of said leg connected to the movable member, the axis of said pin on said movable member being displaced linearly from said line of bending.

9. An electrical resistance wire strain gage, comprising a frame, a movable member, a flat spring connecting said frame to one end of said movable member, the other end of said member being free, said one end of said movable member being spaced from the frame to form a line of bending of said spring between the movable member and the frame, a second flat spring, positioned perpendicularly to the first mentioned flat spring, means for holding said second flat spring securely to said frame, means for holding said flat spring securely to said movable member at said first mentioned end, said last two named means being spaced from each other, one on each side of a line of bending of said second mentioned spring, the lines of bending of both of said springs being substantially coincident, a wire supporting pin mounted on said movable member adjacent the said lines of bending, a gage supporting leg connected to said frame, a gage supporting leg connected to said movable member and positioned in load-transferring relation coincident with the said lines of bending, wire supporting pins mounted on said movable member and said frame, a strain sensitive electrical resistance wire supported on said pins, the extension of the wire between said pins being perpendicular to said lines of bending and to the axis of said leg connected to the movable member, the axis of said pin on said movable member being displaced linearly from said line of bending.

10. An unbonded electrical resistance wire strain gage, comprising a frame, a movable member, a gage supporting leg connected to said frame, a second gage supporting leg connected to said movable member, a spring hinge, means for holding one end of said spring securely to said frame, means for holding the other end of said spring securely to said movable member, said means being spaced from each other, one on each side of a line of bending of said spring, wire supporting pins on said frame and said movable member, a strain sensitive resistance wire mounted on a pin on said frame and on a pin on said movable member, the extension of the wire between said pins being perpendicular to said line of bending and to the axis of said leg connected to the movable member, the axis of said pin on said movable member being displaced linearly from said line of bending.

11. An unbonded electrical resistance wire strain gage, comprising a frame, a movable member, a spring hinge, means for holding said spring securely to said frame, means for holding said spring securely to said movable member at one end of said movable member, said means being spaced from each other, one on each side of a line of bending of said spring, a gage supporting leg connected to said movable member and disposed substantially coincidentally with the line of bending, a second gage supporting leg connected to said frame and spaced from said first leg, wire supporting pins on said frame and said movable member, an electrical resistance strain wire connected to said supporting pins, the extension of the wire between said pins being perpendicular to said line of bending and to the axis of said leg connected to the movable member, the axis of said pin on said movable member being displaced linearly from said line of bending, and means for adjusting the length of said leg depending from said movable member.

12. An electrical resistance wire strain gage, comprising a frame, a movable member, a flat spring, means for holding said spring securely to said movable member at one end of said movable member, said means being spaced from each other, one on each side of a line of bending of said spring, a second flat spring, positioned perpendicularly to the first mentioned flat spring, means for holding said second flat spring securely to said frame, means for holding said flat spring securely to said movable member at said first mentioned end, said last two named means being spaced from each other, one on each side of a line of bending of said second mentioned spring, the lines of bending of both of said springs being substantially coincident, a gage supporting leg connected to said movable member and disposed substantially coincidentally with the line of bending, a second gage supporting leg connected to said frame and spaced from said first leg, a wire supporting pin on said frame, a wire supporting pin on said movable member, an electrical resistance strain wire connected to said supporting pins, the extension of said wire between said pins being perpendicular to said lines of bending and to the axis of said leg connected to the movable member, the axis of said pin on said movable member being displaced linearly from said line of bending, and means for adjusting the length of said leg depending from said movable member.

13. An electrical resistance wire strain gage, comprising a frame, a movable member, a spring hinge connecting said frame to one end of said movable member, the other end of said member being free, said one end of said movable member being spaced from the frame to form a line of bending of said spring between the movable member and the frame, a wire supporting pin mounted on said movable member adjacent the said spring, a gage supporting leg connected to said frame, a gage supporting leg connected to the movable member and positioned in load-transferring relation coincident with the said line of bending, wire supporting pins mounted on said movable member and said frame, a strain sensitive electrical resistance wire supported on said pins, the extension of the wire between said pins being perpendicular to said line of bending and to the axis of said leg connected to the movable member, the axis of said pin on said movable member being displaced linearly from said line of bending, and means for adjusting the length of said leg depending from said movable member.

14. An electrical resistance wire strain gage, comprising a frame, a movable member, a flat spring connecting said frame to one end of said movable member, the other end of said member being free, said one end of said movable member being spaced from the frame to form a line of bending of said spring between the movable member and the frame, a second flat spring, positioned perpendicularly to the first mentioned flat spring, means for holding said second flat spring securely to said frame, means for holding said flat spring securely to said movable member at said first mentioned end, said last two named means being spaced from each other, one on each side of a line of bending of said second mentioned spring, the lines of bending of both of said springs being substantially coincident, a wire supporting pin mounted on said movable member adjacent the said lines of bending, a gage supporting leg connected to said frame, a gage supporting leg connected to said movable member and positioned in load-transferring relation coincident with the said lines of bending, wire supporting pins mounted on said movable member and said frame, a strain sensitive electrical resistance wire supported on said pins, the extension of the wire between said pins being perpendicular to said lines of bending and to the axis of said leg connected to the movable member, the axis of said pin on said movable member being displaced linearly from said line of bending, and means for adjusting the length of said leg depending from said movable member.

15. An unbonded electrical resistance wire strain gage, comprising a frame, a movable member, a gage supporting leg connected to said frame, a second gage supporting leg connected to said movable member, a spring hinge, means for holding one end of said spring securely to said frame, means for holding the other end of said spring securely to said movable member, said means being spaced from each other, one on each side of a line of bending of said spring, wire supporting pins on said frame and said movable member, a strain sensitive resistance wire mounted on a pin on said frame and on a pin on said movable member, the extension of the wire between said pins being perpendicular to said line of bending and to the axis of said leg connected to the movable member, the axis of said pin on said movable member being displaced linearly from said line of bending, and means for adjusting the length of said leg depending from said movable member.

16. An unbonded electrical resistance wire strain gage, comprising a frame, a movable member, a flat spring hinge, means for connecting said spring to said frame and to one end of said movable member, said means being spaced along a line of bending of said movable member, a flat spring hinge disposed perpendicularly to the said first mentioned spring hinge, means for securely connecting the second spring to said frame and to said movable member, said last two named means being spaced from each other, one on each side of a line of bending of said second spring, said lines of bending of said springs being substantially coincidental, a lever arm connected to said movable member at a point between the line of bending of said springs and the free end of said movable member, a gage supporting leg connected to said lever, the said leg being axially coincidental and perpendicular to the said lines of bending, a gage supporting leg connected to said frame, a wire supporting pin mounted on said frame, a wire supporting pin mounted on the movable member adjacent, but linearly displaced from, a strain sensitive wire mounted on the said pin, the extension of said wire being perpendicular to said line of bending.

17. An unbonded electrical resistance wire strain gage, comprising a frame, a movable member, a flat spring hinge, means for connecting said spring to said frame and to one end of said movable member, said means being spaced about a line of bending of said spring, a flat spring hinge disposed perpendicularly to the said first mentioned spring hinge, means for securely connecting the second spring to said frame and to said movable member, said last two named means being spaced from each other, one on each side of a line of bending of said second spring, said lines of bending of said springs being substantially coincidental, a lever arm connected to said movable member at a point between the line of bending of said springs and the free end of said movable member, a gage supporting leg connected to said lever, the said leg being axially coincidental and perpendicular to the said lines of bending, a gage supporting leg connected to said frame, a wire supporting pin mounted on said frame, a wire supporting pin mounted on the movable member adjacent, but linearly displaced from, a strain sensitive wire mounted on the said pin, the extension of said wire being perpendicular to said line of bending, and means for adjusting the length of said legs.

18. An electrical resistance wire strain gage, comprising a frame, a movable member hingedly mounted on said frame on a hinge connected to said frame and said movable member, a gage supporting leg connected to and depending from said movable member and disposed substantially coincidentally with the axis of the hinge, a second gage supporting leg connected to said frame and spaced from said first leg, wire supports on said frame, wire supports on said movable member, and an electrical resistance strain wire connected to said supports.

19. An electrical resistance wire strain gage, comprising a frame, a movable member hingedly mounted on said frame on a spring hinge connected to said frame and said movable member, a wire supporting pin mounted on said movable member adjacent the said spring, a gage supporting leg connected to said frame, a gage supporting leg connected to the movable member and positioned in load-transferring relation coincident with the axis of the hinge, wire supporting pins mounted on said movable member and said frame, and a strain sensitive electrical resistance wire supported on said pins.

20. An electrical resistance wire strain gage, comprising a frame, a movable member hingedly mounted on said frame on a hinge connected to said frame and said movable member, a gage supporting leg connected to said movable member and disposed substantially coincidentally with the axis of the hinge, a second gage supporting leg connected to said movable member and spaced from said first leg, a wire supporting pin on said frame, a wire supporting pin on said movable member, an electrical resistance strain wire connected to said supporting pins, the extension of said wire between said pins being perpendicular to said line of bending and the axis of said leg connected to the movable member, and the axis of said pin on said movable member being displaced linearly from said line of bending.

21. An electrical resistance wire strain gage, comprising a frame, a movable member hingedly mounted on said frame on a hinge connected to said frame and said movable member, a wire supporting pin mounted on said movable member adjacent the said spring, a gage supporting leg connected to said frame, a gage supporting leg connected to the movable member and positioned in load-transferring relation coincident with the axis of the hinge, wire supporting pins mounted on said movable member and said frame, a strain sensitive electrical resistance wire supported on said pins, the extension of said wire between said pins being perpendicular to said line of bending and to the axis of said leg connected to the movable member, the axis of said pin on said movable member being displaced linearly from said axis of the hinge.

22. An unbonded electrical resistance wire strain gage, comprising a frame, a movable member, a gage supporting leg connected to said frame, a second gage supporting leg connected to said movable member, wire supporting pins on said frame and said movable member, a strain sensitive resistance wire mounted on a pin on said frame and on a pin on said movable member, the extension of the wire between said pins being perpendicular to the axis of the hinge and to the axis of said leg connected to the movable member, the axis of said pin on said movable member being displaced linearly from said axis of the hinge.

23. An electrical resistance wire strain gage, comprising a frame, a movable member hingedly mounted on said frame on a hinge connected to said frame and said movable member, a wire supporting pin mounted on said movable member adjacent the said spring, a gage supporting leg connected to said frame, a gage supporting leg connected to the movable member and positioned in load-transferring relation coincident with the axis of the hinge, wire supporting pins mounted on said movable member and said frame, a strain sensitive electrical resistance wire supported on said pins, the extension of said wire between said pins being perpendicular to said line of bending and to the axis of said leg connected to the movable member, the axis of said pin on said movable member being displaced linearly from said axis of the hinge, and means for adjusting the length of said leg depending from said movable member.

24. An unbonded electrical resistance wire strain gage, comprising a frame, a movable member, a gage supporting leg connected to said frame, a second gage supporting leg connected to said movable member, said movable member being hingedly mounted on said frame on a hinge connected to said frame and said movable member, wire supporting pins on said frame and said movable member, a strain sensitive resistance wire mounted on a pin on said frame and on a pin on said movable member, the extension of the wire between said pins being perpendicular to the axis of the hinge and to the axis of said leg connected to the movable member, the axis of said pin on said movable member being displaced linearly from said axis of the hinge, and means for adjusting the length of said leg depending from said movable member.

References Cited in the file of this patent

UNITED STATES PATENTS

| Number | Name | Date |
|---|---|---|
| 2,453,550 | Statham | Nov. 9, 1948 |
| 2,573,285 | Statham | Oct. 30, 1951 |